United States Patent [19]

Berman

[11] Patent Number: 5,523,791
[45] Date of Patent: Jun. 4, 1996

[54] METHOD AND APPARATUS FOR APPLYING OVERLAY IMAGES

[76] Inventor: John L. Berman, 485 Quincy Dr., Mountain View, Calif. 94043

[21] Appl. No.: 136,562

[22] Filed: Oct. 12, 1993

[51] Int. Cl.$^6$ .................................................. H04N 9/74
[52] U.S. Cl. .......................... 348/584; 348/580; 348/598
[58] Field of Search .................................... 348/584, 588, 348/598, 600, 578, 580; H04N 9/74

[56] References Cited

U.S. PATENT DOCUMENTS

| | | | |
|---|---|---|---|
| 4,425,581 | 1/1984 | Schweppe et al. | 348/600 X |
| 4,580,165 | 4/1986 | Patton et al. | 348/600 X |
| 4,739,406 | 4/1988 | Morton et al. | 358/183 |
| 4,827,532 | 5/1989 | Bloomstein | 382/41 |
| 4,841,291 | 6/1989 | Swix et al. | 340/725 |
| 4,855,813 | 8/1989 | Russell et al. | 348/588 X |
| 4,876,600 | 10/1989 | Pietzsch et al. | 358/183 |
| 4,897,726 | 1/1990 | Morton et al. | 358/183 |
| 4,899,139 | 2/1990 | Ishimocki et al. | 340/721 |
| 4,952,051 | 8/1990 | Lovell et al. | 352/87 |
| 4,992,781 | 2/1991 | Iwasaki et al. | 340/747 |
| 4,994,912 | 2/1991 | Lumelsky et al. | 348/578 X |
| 5,017,143 | 5/1991 | Backus et al. | 434/236 |
| 5,041,992 | 8/1991 | Cunningham et al. | 364/518 |
| 5,134,484 | 7/1992 | Wilson . | |
| 5,235,423 | 8/1993 | Dunbar et al. | 348/578 X |

*Primary Examiner*—Victor R. Kostak
*Attorney, Agent, or Firm*—Robert Platt Bell & Associates

[57] ABSTRACT

Apparatus for use with standard television (TV) for superimposing images, captions, titles, or other information over the television scene. Synchronization of the superimposed images with the television scene is brought about by phase locking the images to the horizontal synchronization pulse train of the television scene. A joystick input device allows the television viewer to select from a library of superimposed images and to move the images to any location over the television scene. The viewer can continue to move the superimposed images over the television scene to set up and maintain humorous or other expressive effects. The apparatus can also be used as an educational tool in conjunction with appropriate broadcasted or recorded programming. The horizontal synchronization pulse train of the television scene can be modified by introducing variable time delays from one pulse to the next. This variable synchronization delay can be used to create fun-house mirror effects.

16 Claims, 3 Drawing Sheets

METHOD AND APPARATUS FOR APPLYING OVERLAY IMAGES

TECHNICAL FIELD

This invention pertains to the methods and apparatus for superimposing images over television scenes. Related topics are interaction with television, video and television games, video systems, TV synchronization, and remote control.

BACKGROUND OF THE INVENTION

People want to interact with everything around them. We are visual beings, and we live in a visual society. Television imagery is one of the primary means of communication in today's world. Communication through television has traditionally been a passive activity for the viewer, whose television viewing frequently consists of images of someone else's making, over which he has no control. The viewer often has strong emotional reactions to what he sees on television whether he is watching a newscast, sporting event, commercial advertisement, or any other stimulating program. These strong emotional reactions are frequently critical in nature or of a humorous bent, and many viewers desire to vent their reactions by directing invective or derisive humor at their television. Typically a viewer's expressing his discontent or pleasure have been limited to oral or physical expressions that tend to elevate the viewer's level of tension or lead to physical damage of the television. It would be desirable to offer an alternative and novel means of expression to the traditional avenues mentioned above.

SUMMARY OF THE INVENTION

According to the present invention, an amusement device enables the television viewer to express a variety of opinions and humor in a direct and satisfying fashion. With this invention the viewer uses a joystick input device to select an overlayed image from a library of such images. In the present embodiment of the invention, the joystick input device consists of a two-axis joystick with four additional buttons whose use in combination activates the various functions of the invention. The viewer can access the overlayed images rapidly through direct observation of their appearance over the background video. When the viewer sees the overlayed image he deems suitable for the current background video, he can then position the overlayer image over the background video so as to set up humorous or otherwise expressive effects. To maintain the position of the ovedayed image with respect to the background video (and to sustain the expressive effect), the viewer uses the joystick to move the position of the overlayed image on the screen so as to track the background video. The viewer's enjoyment or tolerance of television programming is enhanced by these overlayed images. Some of this enjoyment is analogous to that derived from adorning faces on magazine covers with abundant facial hair, inappropriate attire, or dental defects.

In the disclosed embodiment, the overlayer images also include of cartoon thought balloons. In these thought balloons, phrases of appropriate subject matter are inserted to give the appearance of revealing the innermost thoughts of a television personality. The present invention not only provides predetermined phrases for very rapid access but also allows the viewer to compose his own phrases letter by letter in typewriter fashion. The viewer can also use this feature to compose captions or titles that exist outside the thought balloons. In the present embodiment, the viewer uses a combination of joystick control buttons to select a letter from the alphabet as it is displayed on the television; however, it will be clear to those skilled in the art that a typewriter keypad control for this purpose is within the scope and spirit of the present invention. The disclosed embodiment of the invention allows the viewer to place on the television screen any number of the supplied overlayed images, erase portions of images, make additions to images, paint his own images from scratch with coarse or fine paintbrushes, blank the background video to draw on a black screen, hide all of the overlayed in-images and drawings and make them reappear instantly for a surprise unveiling. The overlayed images can be moved off screen in one direction and then reenter the screen from another direction to give an added dimension of playfulness.

There are many potential applications of this invention. For example, because the invention uses as input any source of background video, the ovedayed images may be placed over broadcast or cable TV signals, recorded video, or video games. Further, because the invention provides as output the same standard video signal type that was input, the output signal can be further processed or recorded. For example, the viewer could add imagery to an existing video game his friend is playing to provide additional challenge to the player. The viewer could also cream his own video games with prerecorded professional or home videos. Two or more units of the present invention could be cascaded so many viewers could compete or cooperate with one another in their creativity. The invention could also be used as an educational tool in conjunction with video teaching programs that encourage children to call up words, letters, numbers, or other imagery appropriate to the context. Alternative input devices could be used to enable very young children to control the functions of the invention. For example, a xylophone, piano, or alphabetic keyboard input device could be used with teaching videos for children. Such an implementation could be an introduction to music in which the child produces a tone on the xylophone, and the corresponding musical note appears on the screen where the teacher is pointing.

Another application of this invention is as a video message decoder used in conjunction with background video created for this purpose. The background video consists of a picture or a printed message that has had an apparently random distribution of obscuring patterns superimposed over it prior to delivery to the viewer. The resultant video is thus encoded because it cannot be recognized by the unprepared viewer. The invention's library of overlayed images could contain a selection of decoding overlays, one of which has a distribution of patterns that correspond to the encoding pattern. This decoding pattern could be suitably aligned on the background video, and the picture or message could thus be decoded. Such a system could be used in a contest, for example, to encourage viewers to "stay tuned," so they can decode all of the encoded messages that are periodically broadcast.

In the disclosed embodiment, the apparatus consists of two units. The main unit contains the stored overlayed images, the circuitry that synchronizes the overlayed images with the background video, and all of the logic that implements the features of the invention. The second unit is the joystick input device, which allows the viewer to command the main unit. In the disclosed embodiment, the main unit requires an external source of background video and an external television display. The main unit attaches easily to a television and the source of background video with the use of standard cabling. The joystick control attaches to the main unit with a simple cable. It will be clear, however, to those skilled in the art that other arrangements, which combine the functions of the main unit with the source of background video, the joystick control, or the television display are within the scope and spirit of the present invention.

The invention can vary the phases of the horizontal or vertical synchronization pulses. This variable synchronization delay of the horizontal synchronization (VSD) produces a phase shift of the horizontal lines, which varies from line to line. The visual effect of VSD is to warp the background video in a manner similar to a fun-house mirror. The effect on a close-up image of a face can make the jowls bulge or the nose crooked.

Four unique methods employed in this invention are: (1) supplying a locally-generated, ready-to-use library of overlayed images (2) allowing the viewer rapid access to the overlayed images, (3) allowing rapid movement of the overlayed images over the background video, (4) warping the background video by applying a variable phase delay to the horizontal syncronization pulses from line to line.

Other features and advantages not found in existing inventions will be better understood from the following detailed description, together with the appended claims and the attached drawings.

DESCRIPTION OF THE PREFERRED EMBODIMENT

Figure 1:
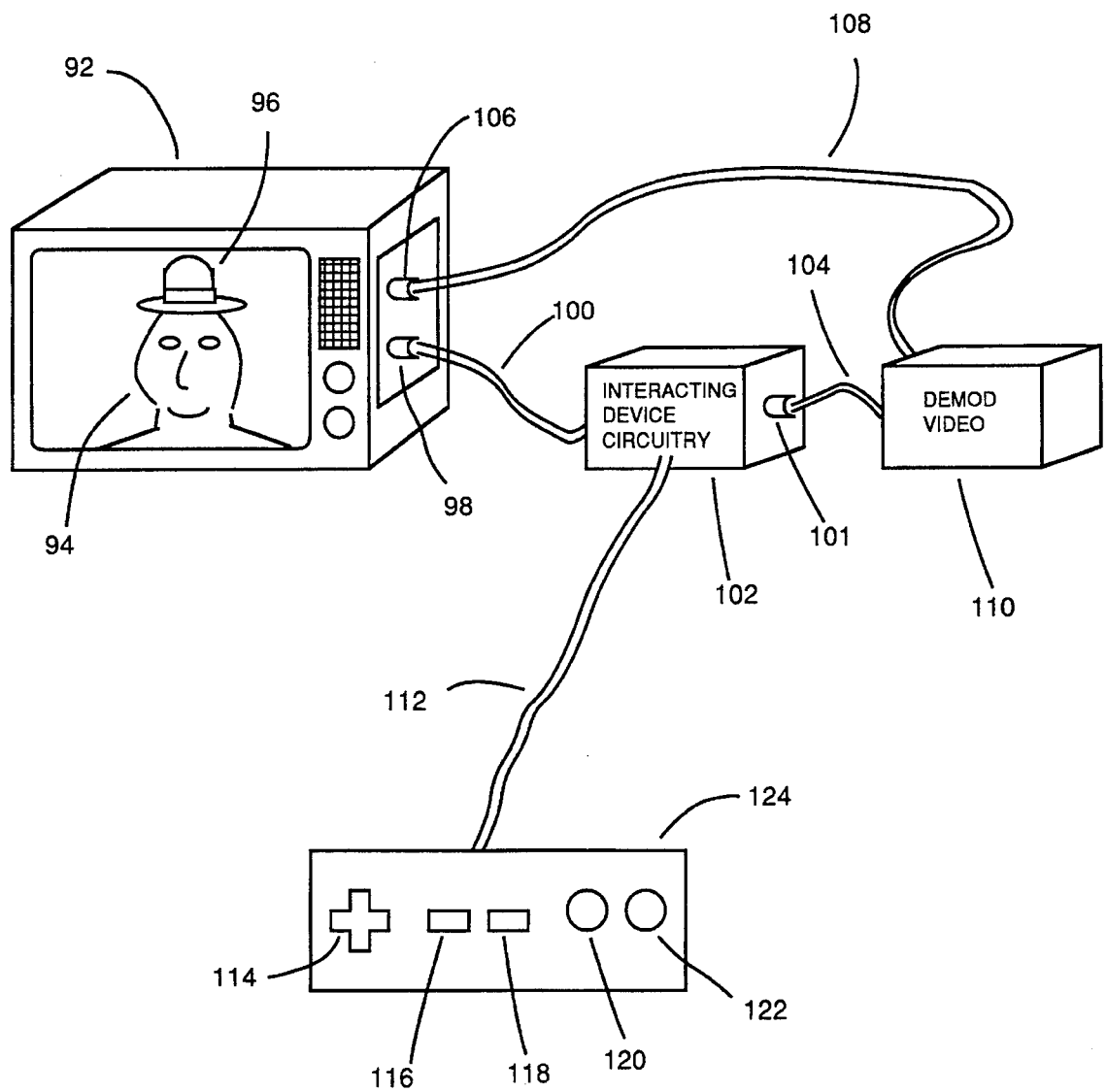
FIG. 1 illustrates the manner in which the preferred embodiment is connected to a television and to a source of background video.

Referring to FIG. 1, a source of demodulated video such as a video cassette recorder (VCR), cable converter, or satellite converter 110 is connected to the interacting apparatus 102 by means of a phono jack 101 and a cable 104. The same source of demodulated video 110 also supplies demodulated audio directly to a conventional television receiver 92 by means of a phono jack 106 and a cable 108. The interacting apparatus colabines the demodulated video 94 (background video) with the overlayed images 96 (overlayed image shown is a hat). This combination of the background video with the overlayed images (combined video) is supplied to the television receiver by means of a phono jack 98 and a cable 100. The interacting apparatus is controlled by means of a joystick 124 connected to the interacting apparatus by means of a cable 112. In the preferred embodiment, the joystick buttons are pressed in combination to signal the interacting apparatus to perform any of the following 11 functions. The joystick signals the interacting apparatus: (1) to scan an electronic library of overlayed images and to select a particular overlayed image, (2) to move the selected overlayed image relative to the background video, (3) to control additions to and deletions from the overlayed image in a painting fashion, (4) to control selection of the colors that are applied in the painting fashion, (5) to combine multiple overlayed images from the library of overlayed images, (6) to temporarily hide the background video so the overlayed images may be modified without distractions from the background video, (7) to temporarily hide the overlayed images so the overlayed images can be used to surprise an unsuspecting viewer, (8) to move the overlayed images off the screen so the horizontal synchronization is delayed to a different degree from one horizontal line to the next to produce horizontal distortions of the picture in the form of a fun-house mirror, (9) to select text to be displayed as a caption or in a cartoon thought balloon, (10) to select the color of said text, (11) to move said text into the appropriate position for a caption or a thought balloon. For example, the position of the overlayed image is controlled by the button 114. Selections from the library of overlayed images is controlled by holding down button 120 while pressing the up or down positions on button 114. The background video is temporarily hidden or restored by button 118.

Figure 2:
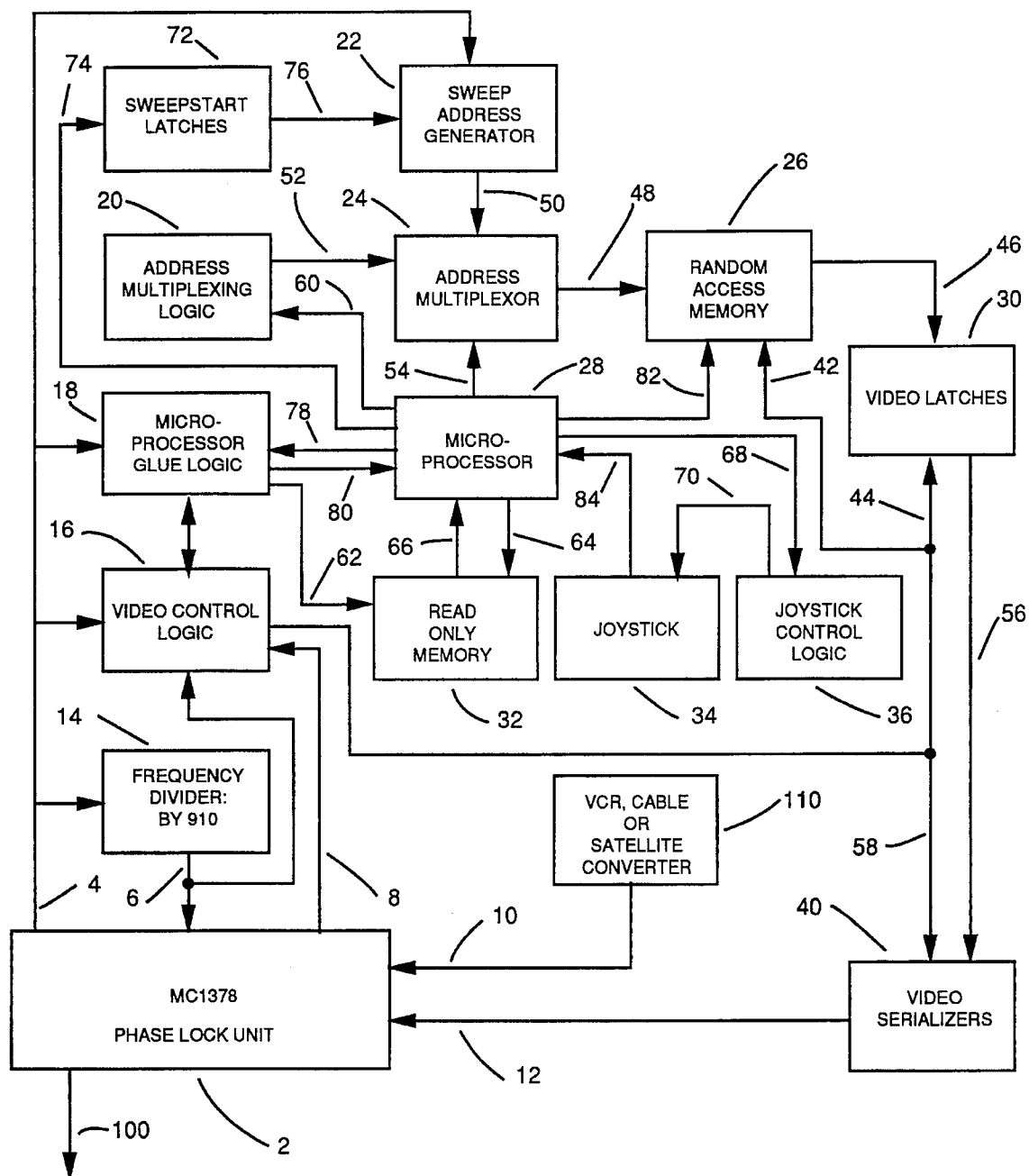
FIG. 2 is a functional block diagram of the electronic circuitry and digital logic of the preferred embodiment.

The operation of the interacting device can be understood with reference to the block diagram of FIG. 2. The synchronization of the overlayed images with the background video is accomplished by means of a phase-lock unit 2 such as that found in the Motorola MC1378. The application note provided with this device gives detailed schematics for one skilled in the art to implement a working device. The phase-lock unit separates the horizontal syncronization pulse (HS pulse) and vertical synchronization pulse (VS pulse) from the baseband video 10 that is supplied by the demodulating unit 110. The phase-lock unit generates the system clock 4 at a frequency of 14.31818 MHz by means of an internal voltage-controlled oscillator (VCO). The system clock is supplied to a frequency divider 14 such as a cascade of 74LS163 synchronous counters, as is well-known in the art. The frequency divider divides the clock frequency by 910 to approximate the true horizontal synchronization frequency of 15.7326 kHz. The frequency divider then generates a pulse that approximates a standard horizontal synchronization pulse 6 (AHS pulse). The AHS pulse is returned to the phase-lock unit. As is well known in the art, a phase comparator in the phase-lock unit compares the phase of the AHS pulse with the HS pulse and generates a suitably-filtered error signal for controlling the VCO. The VCO thus maintains a system clock frequency that is synchronous with the horizontal synchronization of the background video.

The AHS pulse, the VS pulse, and the system clock are supplied to the video control logic 16. The video control logic generates the row address strobe, column address strobe, and read/write signals 42 for the random access memory (DRAM) 26. As is well-known in the art, these signals allow read and write access to the desired memory location in the DRAM. The DRAM receives its address 48 from address multiplexor 24 (74LS157 for example), which selects between the sweep address 50 (a cascade of 74LS 163 synchronous counters for example) or the microprocessor address bus 54. The address multiplexor receives its select signal 52 from the address multiplexing logic 20, whose video mode 60 is set by the the microprocessor 28. The video mode has two states, sweep mode and processor mode.

In sweep mode, the address multiplexor passes DRAM addresses 48 from the sweep address generator 22, which begins its sweep through its address range every VS pulse. This sweep through DRAM addresses is synchronized with the background video and thus causes the DRAM to generate red, green, blue, and overlay data 46 (video data) to produce the overlayed image. The video data is latched by the video latches 30 (74LS75 for example) whose strobe signals 44 are generated synchronously with the video data by the video control logic. The latched video data 56 is supplied to the video serializers 40 (74LS 195A for example). The video serializers receive their pixel clock signal 58 from the video control logic, which has synchronized the pixel clock to the system clock and thus to the background video. The serialized red, green, blue, and overlay data 12 are supplied to the red, green, blue, and overlay enable inputs of the phase-lock unit. Depending on the state of the overlay enable input, the phase-lock unit selects between the background video and the overlayed image, as defined by the red, green, and blue data.

In processor mode, the address multiplexor passes DRAM addresses 48 from the microprocessor. Processor mode is used by the microprocessor to read from or write to DRAM in order to manipulate the contents of DRAM and thus to change the form of the overlayed image. The microprocessor supplies read, write, and memory cycle signals 78 to the microprocessor glue logic 18. The microprocessor glue logic supplies the chip enable signal 62 to the read only memory (ROM) 32. The microprocessor also supplies the program address 64 to the ROM, and as is well known in the art, the ROM returns the program opcode 66 to the microprocessor. The microprocessor glue logic also supplies a video blanking signal 80, derived frown the VS pulse and AHS pulse, back to the microprocessor. The program logic uses the video blanking signal to ensure that DRAM accesses are made only during the blanking period, so as to avoid creating video snow.

As is well known in the art, the apparent position of an image on a video screen can be moved by changing the starting address of the sweep through video memory, here called the latched sweepstart address 76. The microprocessor supplies the sweepstart address 74 to the sweepstart latches 72 (74LS259 for example). The sweepstart latches maintain the latched sweepstart address for the sweepstart generator 22.

The microprocessor initiates a joystick read sequence by sending a joystick request signal 68 to the joystick control logic 36. The joystick control logic in turn sends the clocking signal 70 to the joystick 34 (a parallel to serial converter such as 74LS195A for example). The joystick returns a series of pulses 84 to the microprocessor to indicate which joystick buttons are depressed.

Figure 3:
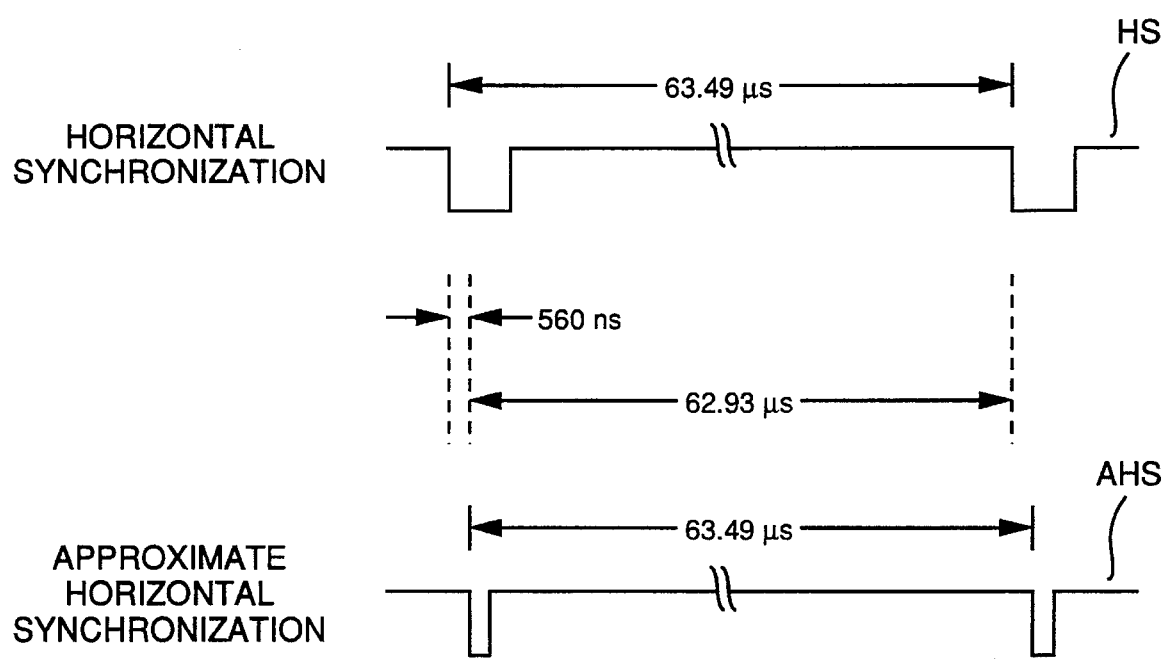
FIG. 3 illustrates a comparison between the horizontal synchronization pulse train and the approximate horizontal synchronization pulse train.

The difference between the HS pulse and the AHS pulse is the basis for a feature of the invention called variable synchronization delay (VSD). VSD is an apparent warping of the image due to a line-to-line shift of the phase of the horizontal synchronization. VSD can be understood more clearly with the help of the example timing diagram of FIG. 3. FIG. 3 shows a comparison of a standard HS pulse train with the AHS pulse train (6 in FIG. 2). The two waveforms are phase locked at the horizontal frequency, but the pulse widths are not the same. The edge of the AHS pulse differs from the edge of the HS pulse by 560 ns in the example. As mentioned previously, the phase-lock unit will select either the background video or the overlayed image depending on the state of its overlay enable pin. The state of the overlay enable pin during the horizontal synchronization period also determines the selection of the HS or the AHS. This state of the overlay enable pin can change from line to line; therefore, the horizontal synchronization can be variably delayed from line to line.

It will be appreciated from the foregoing that, although an embodiment of the invention has been described in detail for purposes of illustration, various modifications may be made without departing from the spirit and scope of the invention. Accordingly, the invention is not to be limited except as by the following claims.

What is claimed is:

1. A method of interacting with a video image, comprising the steps of:

generating a first horizontal synchronization pulse train comprising a plurality of first pulses each having a first predetermined width;

generating a second horizontal synchronization pulse train comprising a plurality of second pulses each having a second predetermined width different than said first predetermined width; and selecting said first and second horizontal pulses for each of a plurality of horizontal scan lines of said video image so as to alter the position of at least one horizontal scan line in said video image.

2. An apparatus for inserting an overlay image onto a background video image, said apparatus comprising:

video input means, for receiving a video signal corresponding to said background video image;

synchronization means, coupled to said video input means, for generating synchronization signals from said background video signal;

viewer input means, comprising selection means for receiving an input command from a viewer to select an overlay image and position input means for receiving a position input from a viewer and generating a position signal to position an image on a display;

processor means, coupled to said operator input means, for receiving said input command and generating overlay image data;

first memory means, coupled to said processor means, for storing said overlay image data;

address generator means, coupled to said memory means, said processor means and said synchronization means for selectively generating memory addresses for said memory means in response to said processor means and in synchronization with said synchronization means; and video output means, coupled to said memory means, for selectively reading the overlay image data from said memory means in synchronization with said synchronization means and merging said overlay image with said background video image.

3. An apparatus for inserting an overlay image onto a background video image, said apparatus comprising:

video input means, for receiving a video signal corresponding to said background video image;

synchronization means, coupled to said video input means, for generating synchronization signals from said background video signal;

operator input means, for receiving an input command from an operator to select an overlay image;

processor means, coupled to said operator input means, for receiving said input command and generating overlay image data;

first memory means, coupled to said processor means, for storing said overlay image data;

address generator means, coupled to said memory means, said processor means and said synchronization means for selectively generating memory addresses for said memory means in response to said processor means and in synchronization with said synchronization means;

video output means, coupled to said memory means, for selectively reading the overlay image data from said memory means in synchronization with said synchronization means and merging said overlay image with said background video image; and second memory means, coupled to said processor means, for storing a plurality of overlay image data representing a plurality of overlay images, wherein said operator input means receives an input command from an operator to select an overlay image from said plurality of overlay images and said processor means receives selected overlay image data corresponding to a selected image from said second memory means and stores the selected overlay image data in said first memory means.

4. The apparatus of claim 3, wherein said operator input means comprises:

a first switching means, selectively actuatable by an operator, for generating a signal to sequentially display each of said plurality of overlay images when actuated.

5. The apparatus of claim 4, wherein said operator input means further comprises:

a second switching means, selectively actuatable by an operator, for generating a signal to select a displayed overlay image as a selected overlay image.

6. The apparatus of claim 4, further comprising:

a start latch, coupled to said processor means and said address generating means, for storing a start address from said processor such that said address generating means selectively generates memory addresses for said memory means from said start address.

7. The apparatus of claim 6, wherein said processor means receives said position signal from said operator input means, and changes said start address in said start latch such that the selected image will overlay said background image in a position corresponding to said position signal.

8. The apparatus of claim 3, wherein said operator input means comprises:

position input means, actuatable by an operator, for generating a position signal to position an image on a display.

9. An apparatus for distorting a video image, said apparatus comprising:

video input means, for receiving a video signal corresponding to said video image;

synchronization means, coupled to said video input means, for separating vertical and horizontal synchronization signals from said video signal and generating horizontal and vertical synchronizing pulses;

operator input means, for receiving an input command from an operator for selecting a normal or distorted image;

video output means, coupled to said operator input means and said synchronization means, for selectively applying, in response to said input command and a predetermined pattern, said horizontal synchronizing signals and said horizontal synchronizing pulses to each horizontal line of said video signal and outputting a distorted video signal for generating a distorted video image.

10. A method for inserting an overlay image onto a background video image, comprising the steps of:

receiving a background video signal corresponding to said background video image, generating synchronization signals from said background video signal, receiving an input command from an operator to select an overlay image, generating overlay image data in response to said input command and storing said overlay image data in a first memory, selectively generating memory addresses for the first memory in synchronization with said synchronization signals, selectively reading the overlay image data from the first memory in synchronization with said synchronization signal and merging said overlay image with said background video image, storing a plurality of overlay image data in a second memory representing a plurality of overlay images, and receiving an input command from an operator to select an overlay image from said plurality of overlay images and storing the selected overlay image data in the first memory.

11. The method of claim 10, wherein said step of receiving an input command from an operator comprises the step of:

selectively actuating a first switch by an operator to generate a signal to selectively display any of said plurality of overlay images.

12. The method of claim 11, wherein said step of receiving an input command from an operator further comprises the step of:

selectively actuating a second switch by an operator to generate a signal to select a displayed overlay image as a selected overlay image.

13. The method of claim 11, further comprising the step of:

storing a start address such that said address generating step selectively generates memory addresses for the first memory from said start address.

14. The method of claim 13, further comprising the steps of:

receiving the position signal from an operator, and changing said start address such that the selected image will overlay said background image in a position corresponding to said position signal.

15. The method of claim 10, wherein said step of receiving an input command from an operator comprises the step of:

actuating a position input by an operator to generate a position signal to position an image on a display.

16. A method of distorting a video image comprising the steps of:

receiving a video signal corresponding to said video image, separating vertical and horizontal synchronization signals from said video signal and generating horizontal and vertical synchronizing pulses, receiving an input command from an operator for selecting a normal or distorted image, selectively applying, in response to said input command and a predetermined pattern, said horizontal synchronizing signals and said horizontal synchronizing pulses to each horizontal line of said video signal and outputting a distorted video signal for generating a distorted video image.

* * * * *